United States Patent
Le Hong et al.

(10) Patent No.: US 8,225,593 B2
(45) Date of Patent: Jul. 24, 2012

(54) TWIN FAN TURBOMACHINE

(75) Inventors: Son Le Hong, Thomery (FR); Olivier Michael Molinari, Avon (FR); Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 673 days.

(21) Appl. No.: 12/163,504

(22) Filed: Jun. 27, 2008

(65) Prior Publication Data

US 2009/0000273 A1 Jan. 1, 2009

(30) Foreign Application Priority Data

Jun. 28, 2007 (FR) ..................................... 07 04648

(51) Int. Cl.
*F02K 3/00* (2006.01)
*F02C 7/06* (2006.01)
*F02C 3/10* (2006.01)

(52) U.S. Cl. ................... 60/268; 60/39.162; 60/39.08

(58) Field of Classification Search ................. 60/268, 60/226.1, 39.162, 39.08

See application file for complete search history.

(56) References Cited

U.S. PATENT DOCUMENTS

| 3,903,690 A * | 9/1975 | Jones ............................ 60/39.08 |
| 5,274,999 A * | 1/1994 | Rohra et al. .................. 60/226.1 |
| 7,458,202 B2 * | 12/2008 | Moniz et al. .................. 60/226.1 |
| 7,614,210 B2 * | 11/2009 | Powell et al. .................. 60/226.3 |
| 2004/0070211 A1 * | 4/2004 | Franchet et al. ................. 290/43 |
| 2008/0148708 A1 * | 6/2008 | Chou et al. ....................... 60/268 |

FOREIGN PATENT DOCUMENTS

| EP | 1 365 154 A2 | 11/2003 |
| EP | 1 564 397 A1 | 8/2005 |
| EP | 1 626 170 A1 | 2/2006 |
| FR | 2 866 073 | 8/2005 |
| GB | 2 194 292 A | 3/1988 |

* cited by examiner

*Primary Examiner* — Ehud Gartenberg
*Assistant Examiner* — Arun Goyal
(74) *Attorney, Agent, or Firm* — Oblon, Spivak, McClelland, Maier & Neustadt, L.L.P.

(57) ABSTRACT

A twin fan turbomachine with two contrarotating fans, one upstream and one downstream, driven by two contrarotating coaxial shafts each of which connects one fan impeller to at least one low-pressure turbine impeller located downstream, the downstream fan impeller being connected by its downstream part to its drive shaft.

16 Claims, 5 Drawing Sheets

TWIN FAN TURBOMACHINE

BACKGROUND OF THE INVENTION AND DESCRIPTION OF THE PRIOR ART

The present invention relates to a twin fan turbomachine with two contrarotating fans and more particularly to a special arrangement of the elements that connect the fans to their drive shafts.

In known turbomachines that incorporate a twin fan mechanical design, two fan impellers spaced axially apart are rotationally driven in contradirections by shafts of a low-pressure turbine located in the downstream part of the turbomachine.

Each low-pressure turbine shaft is attached at its upstream end to a fan impeller drive shaft. The upstream fan impeller drive shaft is connected to the downstream part of the upstream impeller and is surrounded by the drive shaft that drives the downstream fan impeller, which shaft is connected to the upstream part of the downstream fan impeller by a frustoconical connecting wall.

The downstream fan drive shaft is guided at its upstream end by an upstream bearing which is positioned radially inside the downstream fan impeller, and at its downstream end by a downstream bearing. These two bearings are connected by mounts to turbomachine casings. The upstream end of the upstream fan shaft is connected to the upstream end of the downstream fan shaft by an upstream inter-shafts bearing, its downstream end being connected to the downstream end of the downstream fan shaft by a downstream inter-shafts bearing. These two inter-shafts bearings center the upstream fan drive shaft inside the downstream fan drive shaft.

This type of twin fan design has the advantage of reducing the unwanted noise emitted by the engine by halving the rotational speed of each of the two fans by comparison with a single-fan engine and also allows turbomachine efficiency to be improved. However, turbomachines with contrarotating fans known in the prior art do have a number of disadvantages.

Specifically, when the turbomachine is running, the way in which the downstream fan impeller is attached to its drive shaft does not allow the impeller to be kept optimally centered under the effect of centrifugal force. What is more, the mount supporting the upstream bearing that guides the downstream fan shaft needs to be rigid enough to be able in particular to withstand the loads transmitted through the upstream and downstream fan impellers which means, given how long it is, that use has to be made of a relatively heavy mount.

Superimposing the upstream guide bearing with the upstream inter-shafts bearing means that any change to the dimensions of one of the two bearings have to be accompanied by a change in the geometry of the other bearing. In addition, such changes are restricted by the proximity with the upstream guide bearing mount to the downstream fan impeller balancing weights which extend toward the inside of the turbomachine.

The guide bearings are lubricated by nozzles fixed on the mounts supporting these bearings. The upstream and downstream inter-shafts bearings cannot be lubricated in this way because these bearings are located within two rotating shafts thus precluding the fitting of nozzles.

One solution is to install a centrifugal scoop on the downstream fan drive shaft, this scoop being supplied with oil by a nozzle fixed to the downstream guide bearing mount. The oil collected by this scoop passes through orifices in the wall of the downstream fan drive shaft. Under the effect of centrifugal force, this oil flows along the frustoconical internal wall of the downstream fan drive shaft and thus lubricates the downstream inter-shafts bearing and the upstream inter-shafts bearing in turn. This solution has proven to be less effective than the solution involving nozzles because a plug of oil may form at the inter-shafts bearings, thus causing the rolling elements of the bearings to slide rather than roll, thus accelerating bearing wear. However, this solution is still advantageous to a twin fan turbomachine because the rotational speed of each fan is only half that of the shaft of a single-fan turbomachine.

Using the internal wall of the downstream fan drive shaft to guide the oil from the downstream inter-shafts bearing toward the upstream inter-shafts bearing prevents ventilation holes from being made in this wall, the disadvantage of this being to create a substantially hermetic enclosed space between the two drive shafts, and to lead to a pressure difference across the downstream fan. There may also be increases in temperature within this enclosed space which also cause the various components and the lubricating oil to heat up.

Oil separation means are commonly used to recover some of the suspended oil from the spaces between the bearings and thus limit engine oil consumption and atmospheric pollution. However, the radial proximity of the upstream and downstream fan drive shafts means that conventional oil separation means, of the type involving radial vents attached to the upstream fan drive shaft cannot be used in the inter-shafts space because correct operation of such means entails there being a minimum distance between the free end of the radial vents and the internal wall of the downstream fan shaft. Recourse is therefore had to means that are more complicated, more expensive and more cumbersome. In addition, the fact that it is not possible to make holes in the wall of the downstream fan drive shaft between the inter-shafts bearings also prevents any oil separation system from being installed between the upstream guide bearing mount and the downstream fan drive shaft.

SUMMARY OF THE INVENTION

It is a particular object of the invention to provide a simple, economical and effective solution to these problems of the prior art.

To this end, the invention proposes a twin fan turbomachine with two contrarotating fans, one upstream and one downstream, driven by two contrarotating coaxial shafts each of which connects one fan impeller to at least one low-pressure turbine impeller located downstream, wherein the impeller of the downstream fan is connected by its downstream part to its drive shaft.

According to the invention, the downstream fan impeller drive shaft is attached to the downstream part of this impeller in such a way as to leave under the fan impeller enough space to house the balancing weights used to balance the downstream fan impeller.

According to another feature, the upstream part of the shaft of the downstream fan is rotationally guided by a bearing situated downstream of the downstream fan impeller, thus making it possible to reduce the mass and length of the upstream guide bearing mount which is connected to a casing of the turbomachine.

Advantageously, the outside diameter of the bearing is substantially equal to the internal diameter of the downstream fan impeller. Increasing the diameter of the guide bearing by comparison with the prior art allows better transmission of load to the guide bearing mount while at the same time keeping the rolling bearings of a cross section similar to those of the prior art. The low rotational speed of the contrarotating fans allows this change to be made without reducing the life of the bearing.

According to another feature, the downstream part of the downstream fan impeller is bolted to an annular rim of the upstream part of its drive shaft and to the upstream end of a frustoconical wall providing the connection to the rotor of a low-pressure compressor of the turbomachine. The double bolted connection downstream of the downstream fan impeller means that the assembly made up of the low-pressure compressor and of the downstream fan impeller can be balanced in advance before it is mounted on its drive shaft, which is balanced independently. The geometry of this attachment also means that the downstream fan impeller can be kept optimally centered when the turbomachine is in operation, in spite of the effects of centrifugal force.

Advantageously, the upstream part of the downstream fan shaft comprises two frustoconical walls, an upstream one and a downstream one, joined together to form a V-shaped section the vortex of which is directed radially outward and bears the bearing that guides the shaft. The V-shape means that the two drive shafts can be separated radially, thus increasing the volume of the inter-shafts space and allowing conventional oil separation means of the type involving radial vents to be used.

An upstream inter-shafts bearing is mounted between the upstream end of the upstream frustoconical wall of the downstream fan shaft and the upstream end of the upstream fan shaft. Likewise, a downstream inter-shafts bearing is mounted between the two coaxial shafts of the fans at the downstream end of the downstream frustoconical wall of the downstream fan shaft and comprises means of recovering its lubricating oil and guiding it to means that supply oil to the upstream inter-shafts bearing.

In a preferred embodiment of the invention, the means of supplying oil to the upstream bearing comprise a centrifugal scoop incorporated into oil separation means mounted between the two shafts and axial tubes that are diametrically opposed with respect to the axis of the turbomachine, supplied by the centrifugal scoop and supplying a scoop incorporated into an internal nut of the upstream inter-shafts bearing.

According to another feature, the means of recovering the oil from the downstream bearing comprise an axial cylindrical skirt extending an external nut of the downstream bearing in the upstream direction.

Because of the V-shape of the upstream part of the downstream fan shaft, the oil can no longer reach the upstream inter-shafts bearing by flowing along the internal wall of the downstream fan shaft. In order to reestablish an oil supply to the upstream inter-shafts bearing, the external fixing nut used to attach the downstream inter-shafts bearing to the downstream drive shaft is fitted with a cylindrical skirt which guides the oil that has passed through the downstream inter-shafts bearing as far as the centrifugal scoop which communicates with tubes opening at their upstream ends onto a scoop incorporated into an internal nut of the upstream bearing.

The upstream part of the downstream fan drive shaft comprises ventilation holes, making it possible to balance the pressures and temperatures across the downstream fan drive shaft.

The upstream end of the upstream frustoconical part of the downstream fan shaft may be connected by a frustoconical cap to the upstream part of the downstream fan impeller. The purpose of this cap is to close off the space through which the air and oil flows around the bearings and to convey the air tapped from the low-pressure compressor toward systems that pressurize the space. The cap may be made of a lightweight material because it plays no part in the mechanical integrity of the downstream fan.

According to another feature, the frustoconical cap is connected at its upstream end to an annular wall extending radially inward and the radially internal end of which lies flush with part of the downstream fan drive shaft located upstream of the upstream bearing, so as to form a system to pressurize the space.

The annular wall advantageously comprises ventilation holes formed in its thickness, opening at the radially internal end of the annular wall and into the space that lies between the downstream fan impeller and the upstream frustoconical wall of the downstream fan shaft. A flow of air through these orifices can thus become established in the downstream to upstream direction, preventing the upstream bearing lubricating oil from reaching upstream of the frustoconical cap and thus finding its way into the secondary flow duct from which the cabin ventilation air is tapped.

BRIEF DESCRIPTION OF THE DRAWINGS

The invention will be better understood and other details, advantages and features of the invention will become apparent from reading the following description given by way of nonlimiting example and with reference to the attached drawings in which.

DESCRIPTION OF THE PREFERRED EMBODIMENT(S)

Figure 1:
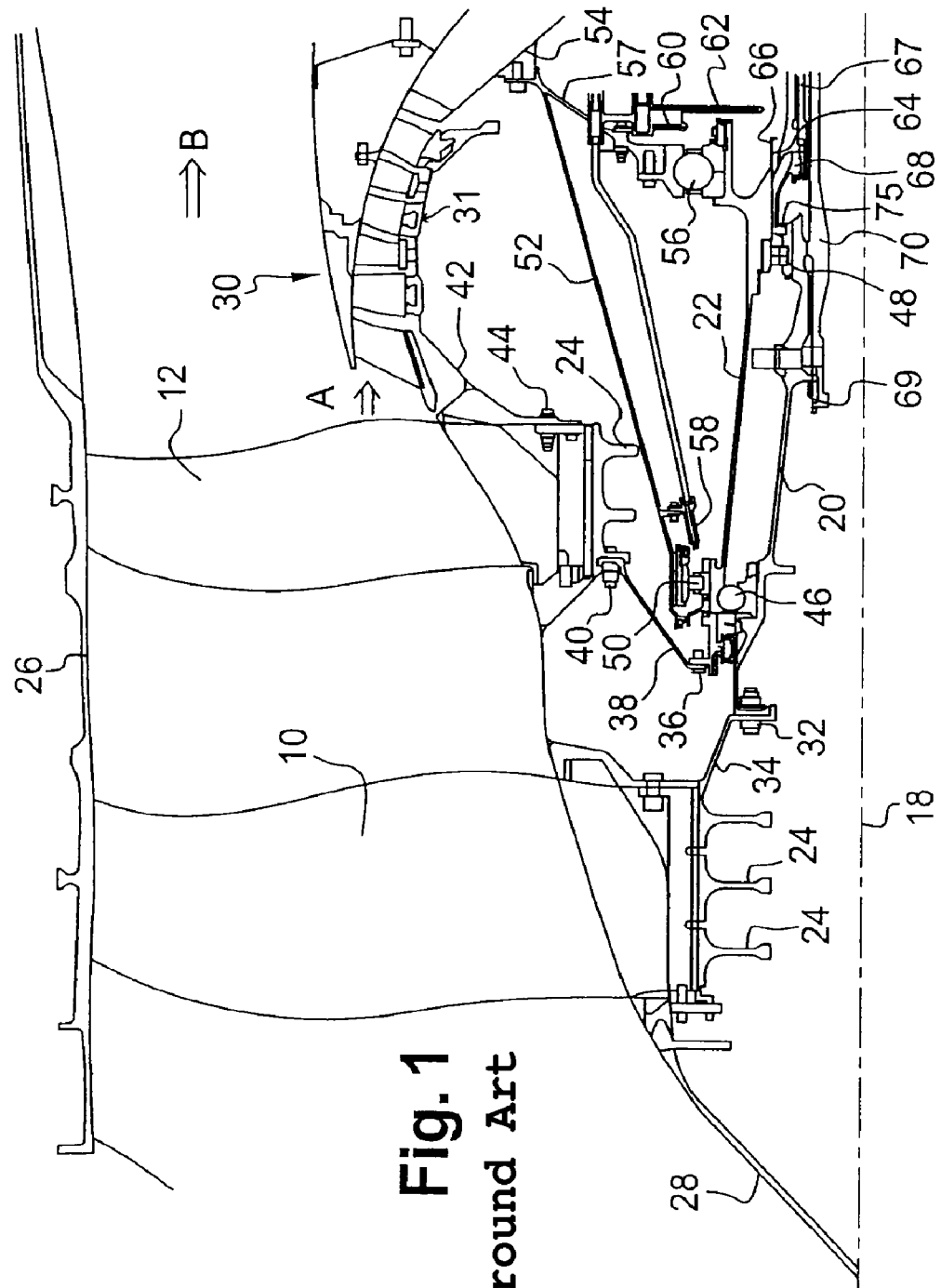
FIG. 1 is a partial schematic half view in axial section of a twin fan turbomachine according to the prior art.

Reference is made first of all to FIG. 1 which depicts part of a twin fan turbomachine according to the prior art. A turbomachine such as this comprises two contrarotating fan impellers, an upstream one 10 and a downstream one 12, rotationally driven about the axis 18 of the turbomachine by two coaxial shafts 20, 22, the downstream fan shaft 22 surrounding the upstream fan shaft 20. Each of the fan impellers comprises weights 24 extending radially inward and used for rotationally balancing the impellers 10, 12. The fan impellers 10, 12 are externally surrounded by a retaining casing 26 which ducts the flow of air entering the turbomachine.

The two, upstream and downstream, fans are mounted downstream of a cone 28 used to direct the air flow entering the turbomachine and upstream of a low-pressure compressor 30 which splits the air flow into a primary air flow represented by the arrow A and a secondary air flow represented by the arrow B.

The upstream end of the upstream fan shaft 20 is attached by a screw/nut system 32 to a frustoconical connecting wall 34 connecting it to the downstream face of the upstream fan impeller 10. The upstream end of the downstream fan shaft 22 is attached by a screw/nut system 36 to the upstream end of a frustoconical wall 38 the cross section of which widens in the downstream direction, the downstream end of this frustoconical wall 38 being connected by a screw/nut system 40 to the upstream face of the downstream fan impeller 12. The downstream part of the downstream fan impeller 12 is connected by a frustoconical connecting wall 42 to the rotor 31 of the low-pressure compressor 30 via a screw/nut system 44.

The upstream fan shaft 20 is supported in its rotation by the downstream fan shaft 22, via an upstream inter-shafts bearing 46 and a downstream inter-shafts bearing 48.

An upstream guide bearing 50 positioned at the upstream end of the downstream fan shaft 22 is mounted on a frustoconical support wall 52 fixed to a casing 54 of the turbomachine. A downstream guide bearing 56 is inserted between the downstream end of the downstream fan shaft 22 and a bearing mount 57 fixed to the casing 54.

The upstream inter-shafts bearing 46 and the downstream guide bearing 56 are of the ball bearing type which means that they are capable of withstanding axial load, while the downstream inter-shafts bearing 48 and the upstream guide bearing 50 are of the roller bearing type so that they can withstand the radial loads from the turbomachine.

A first oil nozzle 58 is fixed to the internal face of the frustoconical support wall 52 and is thus able to lubricate the upstream guide bearing 50. A second oil nozzle 60 and a third one 62, both fixed to the bearing mount 57, are positioned substantially radially with their oil outlets directed radially inward and can be used to lubricate the downstream guide bearing 56 and the downstream inter-shafts bearing 48, respectively.

The downstream end of the downstream fan shaft 22 has axial orifices 64 which open upstream toward the downstream inter-shafts bearing 48 and downstream toward a centrifugal scoop 66 that recovers oil originating from the third nozzle 62.

The downstream end of the downstream fan shaft 22 is attached to a low-pressure turbine shaft 67 (not depicted) using a nut 68 tightened onto the upstream end of this first low-pressure turbine shaft 67. Similarly, the downstream end of the upstream fan shaft 20 is attached by a tightening nut 69 to a second low-pressure turbine shaft 70 surrounded by the first low-pressure turbine shaft 67. The nut 68 has an axial cylindrical skirt which extends in the upstream direction and at its upstream end seals against a rotary seal 75 mounted at the downstream end of the upstream fan shaft 20, downstream of the downstream inter-shafts bearing 48.

When the turbomachine is in operation, the combustion gases cause the turbine blades and therefore the shafts 67, 70 to rotate in opposite directions. Thus, the upstream and downstream fan shafts 20, 22 rotate in opposite directions, thus reducing the unwanted noise and increasing efficiency by comparison with a single-fan turbomachine.

The upstream inter-shafts bearing 46 is lubricated as follows: oil originating from the third nozzle 62 is recovered by the centrifugal scoop 66 then passes through the axial orifices 64 in the downstream fan shaft 22 to be supplied to the downstream bearing 48. Finally, the oil flows upstream along the internal wall of the downstream fan shaft 22 under the effect of centrifugal force and lubricates the upstream inter-shafts bearing 46.

With this type of mechanical design, the dimensions of the upstream inter-shafts bearing 46 and of the upstream guide bearing 50 can be altered only very slightly because of the proximity of the balancing weights 24 to the upstream guide bearing 50 mount 52. Furthermore, it is not possible to make holes in the downstream fan shaft 22 for circulating the air bled from the low-pressure compressor 30 to the upstream fan shaft 20 because the lubricating oil flows along this shaft. In addition, the radial spacing between the two fan shafts 20, 22 is not big enough for conventional oil separation means of the radial vents type to be fitted.

Figure 2:
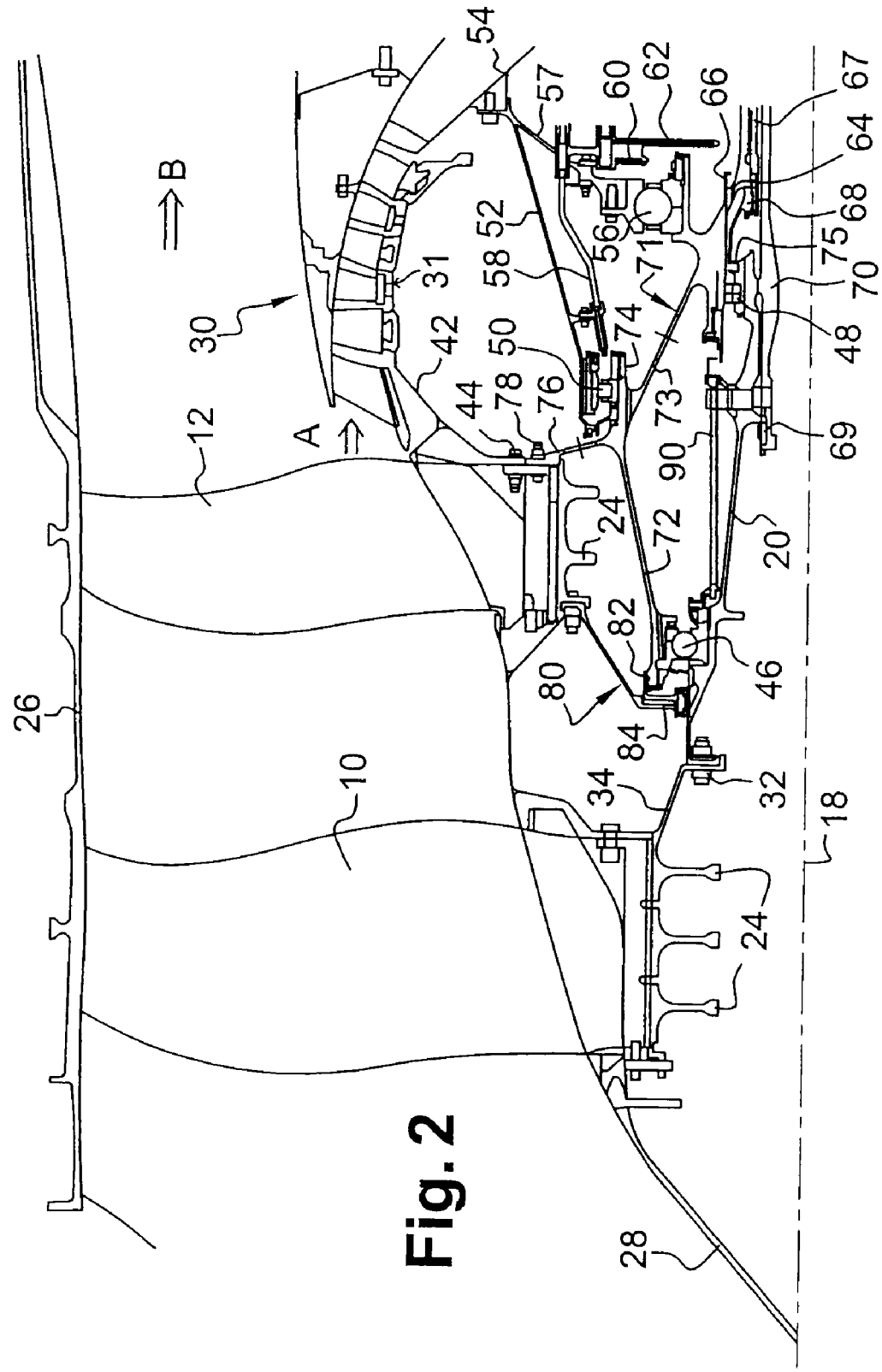
FIG. 2 is a partial schematic half view in axial section of a turbomachine comprising two contrarotating fans, one upstream and one downstream, according to the invention.
Figure 3:
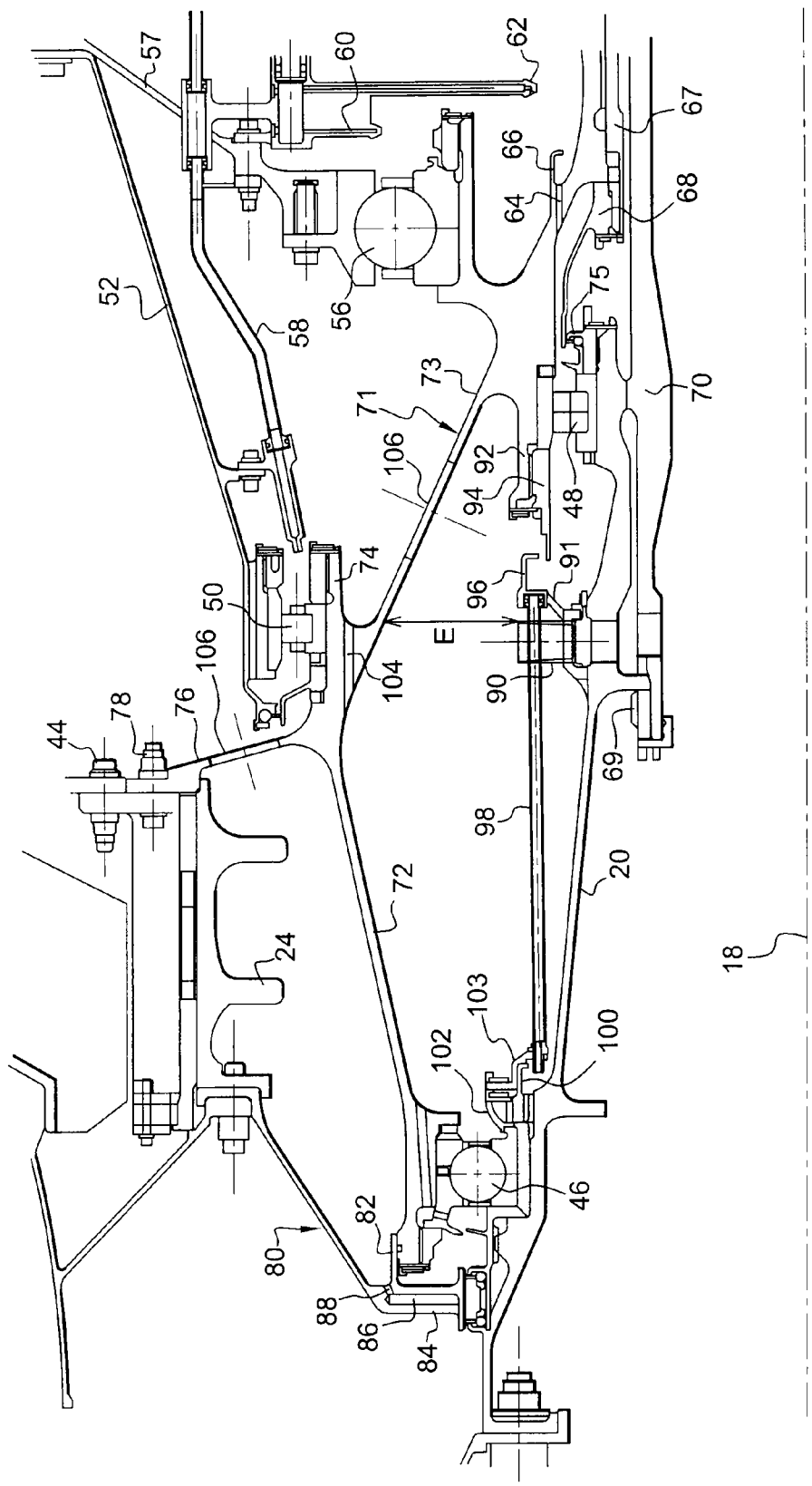
FIG. 3 shows an enlarged part of FIG. 2.

The invention depicted in FIGS. 2 and 3 overcomes the problems of this type of twin fan design by virtue of the fact that the connection between the downstream fan shaft 71 and its impeller 12 is on the downstream part of the impeller 12. The shaft 71 of the downstream fan impeller 12 has two frustoconical walls 72, 73, these being an upstream one and a downstream one, which are joined together to form a V section. The vortex of the V is directed radially outward and comprises a cylindrical platform 74 bearing the guide bearing 50 that guides the downstream fan shaft 71. An annular rim 76 extends in the vortex of the V and is connected to the downstream face of the downstream fan impeller 12 by a screw/nut system 78. This connection allows the downstream fan impeller to be kept centered under the effect of centrifugal force. A second bolted connection 44 connects the downstream face of the downstream fan impeller 12 to the frustoconical wall 42 of the rotor 31 of the low-pressure compressor 30. This double connection allows the assembly made up of the downstream fan impeller 12 and the rotor 31 of the low-pressure compressor 30 to be dynamically balanced before this assembly is mounted on the downstream fan shaft 71.

The invention allows the upstream guide bearing 50 to be offset axially downstream and radially outward. The bearing mount 52 can thus be shortened, thus reducing the mass of the turbomachine. This novel method of attachment also makes it possible to free up space inside the downstream fan impeller 12 for fitting the balancing weights 24.

The upstream inter-shafts bearing 46 is mounted between the upstream end of the upstream frustoconical wall 72 of the downstream fan shaft 71 and the upstream end of the upstream fan shaft 20. Similarly, the downstream inter-shafts bearing 48 is mounted between the downstream end of the downstream frustoconical wall 73 of the downstream fan shaft 71 and the downstream end of the upstream fan shaft 20.

A frustoconical cap 80 connects the upstream end of the upstream frustoconical wall 72 of the downstream fan shaft 71 to the upstream face of the downstream fan impeller 12. The frustoconical cap 80 is connected at its upstream end to a cylindrical wall 82 extending in the downstream direction and to an annular wall 84 extending radially inward. The cylindrical wall 82 has its radially internal face bearing against the upstream end of the upstream frustoconical wall 72 of the downstream fan shaft 71. The radially internal end of the annular wall 84 lies flush with part of the upstream fan shaft 20. The annular wall 84 also has a number of holes 86 made in its thickness. These holes open at one end substantially at right angles to the downstream fan shaft and at the other end onto holes 88 made from the cavity contained between the upstream frustoconical wall 72 of the downstream fan shaft 71 and the downstream fan impeller 12. By contrast with the prior art, this cap 80 plays no part in transmitting load when the turbomachine is operating, allowing use to be made of a lightweight material.

The change to the geometry of the downstream fan shaft 71 means that radial oil separation ducts 90 attached to the upstream fan shaft 20 by means of a ring 91 and extending between the two fan shafts 20, 71 can be installed. Specifically, the spacing E between the downstream frustoconical wall 73 of the downstream fan shaft 71 and the radially external end of the ducts 90 is now greater than the minimal distance required for correct operation of this type of oil separation means (FIG. 3).

A new way of circulating oil has been developed because the V shape of the downstream fan shaft 71 does not allow lubricating oil from the downstream inter-shafts bearing 48 to flow as far as the upstream inter-shafts bearing 46. For that reason, the downstream end of the downstream frustoconical wall 73 of the downstream fan shaft 71 comprises means of recovering oil from the downstream inter-shafts bearing 48. These means comprise an axial cylindrical skirt 92 extending the external clamping nut 94 of the downstream inter-shafts bearing 48 in the upstream direction.

These recovery means secured to the downstream fan shaft 71 collaborate with means conveying oil to the upstream inter-shafts bearing 46. The conveying means comprise a downstream centrifugal scoop 96 incorporated into the ring 91 that holds the oil separation ducts 90 and which is connected upstream to two tubes 98 extending toward the upstream inter-shafts bearing 46. These tubes 98, directed axially or, in an ideal configuration, inclined outwards slightly from the downstream to upstream direction in order to accelerate the oil under the effect of centrifugal force, are mounted between the radial oil separation ducts 90. The two tubes 98 are diametrically opposed with respect to the axis 18 of the turbomachine, so as not to unbalance the upstream fan shaft 20 when the turbomachine is running. An upstream centrifugal scoop 100 is incorporated into an internal attachment nut that secures the upstream inter-shafts bearing 46 and is secured to the upstream fan shaft 20.

The tubes 98 are inserted between the ducts 90 and are mounted by nesting them between the ring 91 that holds the ducts 90 and a retaining ring 103. A ring 102 locks the internal fastening nut used to secure the upstream inter-shafts bearing 46 and centers and angularly indexes the ring 103 with respect to the upstream fan shaft 20. The duct retaining ring 91 is also angularly indexed with respect to the upstream fan shaft 20. The dual indexing of the rings 91 and 103 ensures that the tubes 98 are installed parallel to one another at the correct angles.

The upstream end of the downstream frustoconical wall 73 has axial holes 104 formed under the platform 74 and which open on each side of the downstream frustoconical wall 73.

The annular rim 76 and the downstream frustoconical wall 73 of the downstream fan shaft 71 have ventilation holes 106.

Figure 4:
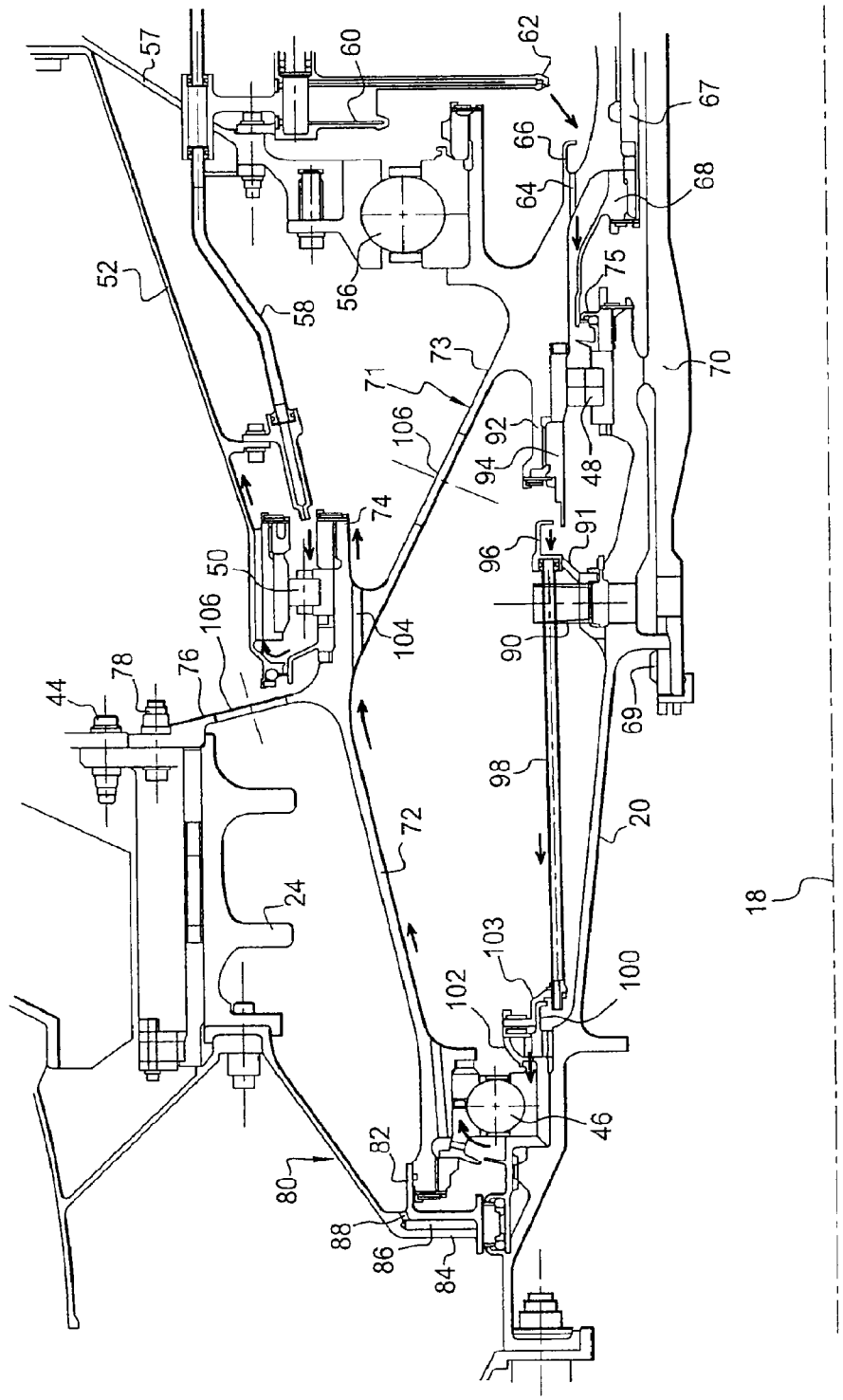
FIGS. 4 and 5 are views identical to FIG. 3 illustrating the lubricating of the bearings and the flow of air through a twin fan turbomachine according to the invention.

The upstream and downstream inter-shafts bearings 46, 48 are lubricated as depicted by the arrows in FIG. 4. The oil is sprayed by the third nozzle 62 and the scoop 66 of the downstream fan shaft 71 allows the oil to be directed through the holes 64 as far as the downstream inter-shafts bearing 48. Under the effect of centrifugal force, the oil passing through the downstream inter-shafts bearing 48 is recovered and guided as far as the upstream end of the tightening nut 94 and is then sprayed toward the downstream scoop 96. The oil then passes through the tubes 98 as far as the upstream scoop 100 which recovers the oil and supplies it to the upstream inter-shafts bearing 46. This oil then travels through a network of holes and passages as far as the inner race of the upstream inter-shafts bearing 46 which distributes the oil to the rolling elements. The oil sprayed upstream of the upstream inter-shafts bearing 46 is collected by a scoop which directs it toward a network of holes that allow it to be returned toward the downstream side of this bearing to link up with the oil sprayed downstream of the upstream inter-shafts bearing 46. The oil then spreads in the downstream direction over the internal surface of the upstream frustoconical wall 72 of the downstream fan shaft 71 under the effect of centrifugal force. It then passes through the holes 104 made under the platform 74 then under the effect of gravity trickles along the internal wall of the upstream guide bearing 50 mount 52.

In order for the various scoops to allow the lubricating oil to flow correctly, the inside diameter of the upstream inter-shafts bearing 46 has been increased by comparison with the prior art.

Figure 5:
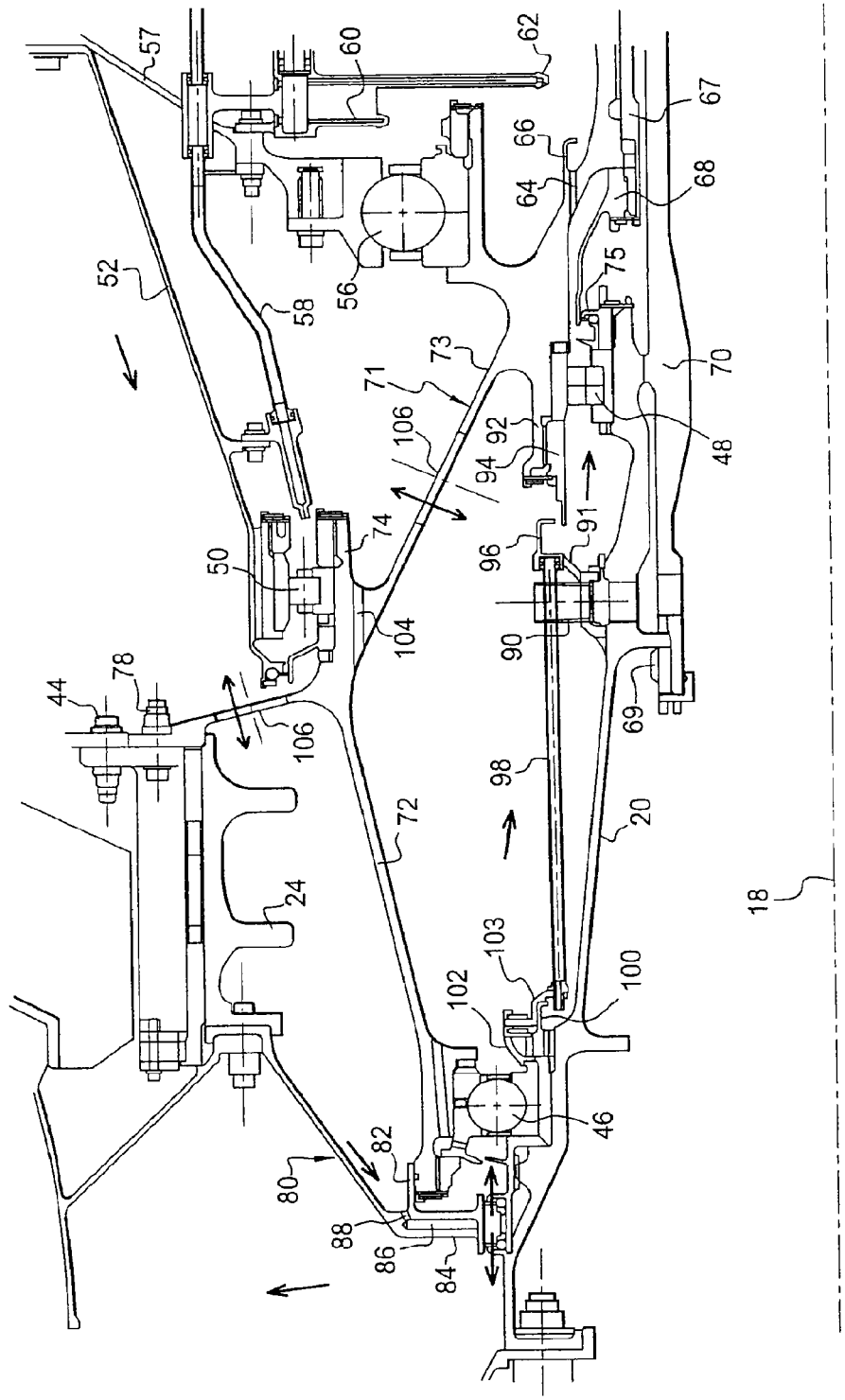

The invention allows air bled from the low-pressure compressor 30 to flow as far as the upstream fan shaft 20 through the holes 106 in the downstream fan shaft 71 thus avoiding any pressure differential between the two fan shafts (FIG. 5). An air flow is created through the pressurizing orifices 88, 86 from the cavity located between the downstream fan impeller 12 and the upstream frustoconical wall 72 toward the radially internal end of the annular wall 84 of the frustoconical cap 80. This flow keeps in place, downstream of the frustoconical cap 80, the lubricating oil which has reached the upstream bearing 46. This then prevents oil losses upstream of the cap 80, which losses could otherwise be ejected into the secondary flow duct from which the cabin ventilation air is bled. A turbomachine twin fan according to the invention is assembled as follows: the shaft 71 of the downstream fan impeller 12 is assembled with the guide bearings 50 and 56. The assembly thus formed is fixed to a casing 54 of the turbomachine via the mounts 52, 57 of the guide bearings 50 and 56. The annular rim 76 of the downstream fan shaft 71 is bolted 78 to the downstream part of the downstream fan impeller 12. The downstream end of the downstream fan shaft 71 is secured using a nut 68 to its low-pressure turbine shaft 67. The upstream fan shaft 20 is inserted, with the upstream 46 and downstream 48 rolling bearings, inside the downstream fan shaft 71 and is fixed at its downstream end to its low-pressure turbine shaft 70 using a nut 69. Finally, the upstream end of the upstream fan shaft 20 is attached to the upstream impeller 10 and an inlet cone 28 is fitted upstream of the twin fan thus assembled.

As an alternative, the upstream inter-shafts bearing 46 and the downstream guide bearing 56 are of the roller bearing type and the downstream inter-shafts bearing 48 and the upstream guide bearing 50 are of the ball bearing type.

The invention claimed is:

1. A twin fan turbomachine comprising:
    two contrarotating upstream and downstream fan impellers which are mounted upstream of a low-pressure compressor, said upstream fan impeller having a hub connected via an upstream fan shaft to a first low pressure turbine shaft, said downstream fan impeller having a hub connected via a downstream fan shaft to a second low pressure turbine shaft,
    wherein a downstream part of the hub of the downstream fan impeller is connected to the downstream fan shaft, and
    wherein an upstream part of the downstream fan shaft comprises upstream and downstream frustoconical walls joined together to form a V-shaped section, a vertex of which is directed radially outward and bears a guide bearing that guides the downstream fan shaft.

2. The turbomachine as claimed in claim 1, wherein an upstream part of the downstream fan shaft is rotationally guided by a bearing situated downstream of the hub of the downstream fan impeller.

3. The turbomachine as claimed in claim 2, wherein an outside diameter of the bearing is substantially equal to an internal diameter of the hub of the downstream fan impeller.

4. The turbomachine as claimed in claim 1, wherein the downstream part of the hub of the downstream fan impeller is bolted to an annular rim of the upstream part of the downstream fan shaft and to an upstream end of a frustoconical wall providing the connection to the rotor of a low-pressure compressor of the turbomachine.

5. The turbomachine as claimed in claim 1, wherein an upstream inter-shafts bearing is mounted between an upstream end of the upstream frustoconical wall of the downstream fan shaft and an upstream end of the upstream fan shaft.

6. The turbomachine as claimed in claim 5, wherein a downstream inter-shafts bearing is mounted between the coaxial upstream and downstream fan shafts at a downstream end of the downstream frustoconical wall of the downstream fan shaft and comprises means of recovering lubricating oil and guiding the recovered oil to means that supply oil to the upstream inter-shafts bearing.

7. The turbomachine as claimed in claim 6, wherein the means of recovering the oil from the downstream bearing comprise an axial cylindrical skirt extending an external nut of the downstream bearing in the upstream direction.

8. The turbomachine as claimed in claim 6, wherein the means of supplying oil to the upstream bearing comprise a centrifugal scoop incorporated into oil separation means mounted between the upstream and downstream fan shafts and axial tubes that are diametrically opposed with respect to the axis of the turbomachine, supplied by the centrifugal scoop and supplying a scoop incorporated into an internal nut of the upstream inter-shafts bearing.

9. The turbomachine as claimed in claim 8, wherein the oil separation means includes radial oil separation ducts attached to the upstream fan shaft by a first ring near a downstream end of the axial tubes.

10. The turbomachine as claimed in claim 9, wherein a retaining ring is disposed at an upstream end of the axial tubes.

11. The turbomachine as claimed in claim 10, further comprising a lock ring which locks the internal nut of the upstream inter-shafts bearing and centers and angularly indexes the retaining ring with respect to the upstream fan shaft.

12. The turbomachine as claimed in claim 1, wherein the upstream part of the downstream fan drive shaft comprises ventilation holes.

13. The turbomachine as claimed in claim 1, wherein an upstream end of the upstream frustoconical wall of the downstream fan shaft is connected by a frustoconical cap to an upstream part of the hub of the downstream fan impeller.

14. The turbomachine as claimed in claim 13, wherein an upstream end of the frustoconical cap is connected to an annular wall extending radially inward and a radially internal end of the annular wall lies flush with part of the downstream fan drive shaft located upstream of the upstream bearing.

15. The turbomachine as claimed in claim 14, wherein the annular wall comprises ventilation holes formed in its thickness, the ventilation holes open at the radially internal end of the annular wall and into a space defined between the hub of the downstream fan impeller and the upstream frustoconical wall of the downstream fan shaft.

16. The turbomachine as claimed in claim 1, wherein the downstream frustoconical wall of the downstream fan shaft includes bleed holes through which air bled from the low-pressure compressor flows.

* * * * *